(12) United States Patent
Liu

(10) Patent No.: US 11,175,820 B2
(45) Date of Patent: Nov. 16, 2021

(54) METHOD, DEVICE, AND TERMINAL DEVICE FOR EXTRACTING DATA

(71) Applicant: Advanced New Technologies Co., Ltd., Grand Cayman (KY)

(72) Inventor: Lindong Liu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/212,316

(22) Filed: Dec. 6, 2018

(65) Prior Publication Data

US 2019/0114049 A1 Apr. 18, 2019

Related U.S. Application Data

(63) Continuation of application No. PCT/CN2017/086068, filed on May 26, 2017.

(30) Foreign Application Priority Data

Jun. 7, 2016 (CN) .......................... 201610399225.8

(51) Int. Cl.
*G06F 3/0488* (2013.01)
*G06F 40/205* (2020.01)
(Continued)

(52) U.S. Cl.
CPC ........ *G06F 3/0488* (2013.01); *G06F 3/04842* (2013.01); *G06F 40/205* (2020.01); *G06F 40/284* (2020.01); *G06F 40/53* (2020.01)

(58) Field of Classification Search
CPC .......... G06F 3/048; G06F 21/10; G06F 40/20; G06F 40/28; G06F 40/53; G06F 40/00
See application file for complete search history.

(56) References Cited

U.S. PATENT DOCUMENTS 6,279,041 B1 * 8/2001 Baber ..................... H04L 47/10
370/235
2003/0086616 A1 * 5/2003 Oh ........................ G03F 9/7076
382/209

(Continued)

FOREIGN PATENT DOCUMENTS

CN 102591880 7/2012
CN 102681753 9/2012

(Continued)

OTHER PUBLICATIONS

International Search Report by the International Searching Authority issued in International Application No. PCT/CN2017/086068 dated Aug. 2, 2017; 9 pages.

(Continued)

*Primary Examiner* — Jennifer N To
*Assistant Examiner* — Qi Wan
(74) *Attorney, Agent, or Firm* — Fish & Richardson P.C.

(57) ABSTRACT

The present invention discloses a method and a device for extracting data from a touchscreen. One example method includes determining a pressing operation position on a touchscreen of a terminal device based on a pressing operation instruction received from a user; determining a data area from which data is to be extracted based on the pressing operation position; determining a data extraction rule for use in extracting the data from the data area, wherein the data extraction rule is based on a data type of the data to be extracted or based on attribute information of the data to be extracted; extracting data from the data area based on the determined data extraction rule; and displaying the extracted data on the touchscreen.

14 Claims, 7 Drawing Sheets

(51) Int. Cl.
  *G06F 3/0484* (2013.01)
  *G06F 40/53* (2020.01)
  *G06F 40/284* (2020.01)

(56) References Cited

U.S. PATENT DOCUMENTS

| | | | |
|---|---|---|---|
| 2004/0243408 A1* | 12/2004 | Gao | G06F 17/2755 704/240 |
| 2009/0204562 A1* | 8/2009 | Wong | G06N 5/02 706/47 |
| 2010/0278427 A1* | 11/2010 | Li | G06F 40/289 382/177 |
| 2011/0077998 A1* | 3/2011 | Yan | G06Q 30/02 705/7.29 |
| 2013/0004076 A1* | 1/2013 | Koo | G06K 9/228 382/176 |
| 2014/0285451 A1 | 9/2014 | Isomura et al. | |
| 2014/0304655 A1 | 10/2014 | Imoto et al. | |
| 2015/0025875 A1* | 1/2015 | Perrone | G06F 17/2785 704/9 |
| 2015/0091821 A1 | 4/2015 | Zuo et al. | |
| 2015/0146220 A1* | 5/2015 | Oki | H04N 1/32144 358/1.2 |
| 2015/0161246 A1* | 6/2015 | Liu | G06F 3/0233 707/722 |
| 2015/0205877 A1* | 7/2015 | Rhoads | G06F 21/10 707/723 |
| 2015/0221057 A1* | 8/2015 | Raheja | G16H 40/20 705/2 |
| 2015/0326520 A1* | 11/2015 | Zhong | H04L 67/306 709/206 |
| 2016/0048298 A1* | 2/2016 | Choi | G06F 3/04842 715/846 |
| 2016/0063339 A1* | 3/2016 | Kwon | G06F 3/04817 382/229 |
| 2016/0132587 A1* | 5/2016 | Liu | G06F 17/248 707/738 |
| 2017/0147546 A1 | 5/2017 | Ishii et al. | |

FOREIGN PATENT DOCUMENTS

| | | |
|---|---|---|
| CN | 103472998 | 12/2013 |
| CN | 103546877 | 1/2014 |
| CN | 104317949 | 1/2015 |
| CN | 105159533 | 12/2015 |
| CN | 105577648 | 5/2016 |
| JP | 2000122774 | 4/2000 |
| JP | 2004258759 | 9/2004 |
| JP | 2007102685 | 4/2007 |
| JP | 2012058819 | 3/2012 |
| JP | 2012185323 | 9/2012 |
| JP | 2013003949 | 1/2013 |
| JP | 2013186540 | 9/2013 |
| JP | 2014201787 | 2/2014 |
| JP | 2014203288 | 10/2014 |
| JP | 2015530687 | 10/2015 |
| JP | 2015534171 | 11/2015 |
| JP | 2015232898 | 12/2015 |
| JP | 2016500178 | 1/2016 |
| JP | 2017519263 | 7/2017 |
| KR | 19930006475 | 7/1993 |
| KR | 20160021637 | 2/2016 |
| KR | 20160026142 | 3/2016 |
| TW | 201142686 | 12/2011 |
| TW | I462034 | 11/2014 |
| WO | 2015141101 | 9/2015 |
| WO | WO 2015141101 | 9/2015 |
| WO | WO 2015196964 | 12/2015 |

OTHER PUBLICATIONS

PCT International Preliminary Report on Patentability in International Application No. PCT/CN2017/086068, dated Dec. 11, 2018, 8 pages (with English Translation).

PCT Written Opinion of the International Searching Authority in International Application No. PCT/CN2017/086068, dated Aug. 2, 2017, 7 pages (with English translation).

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

European Extended Search Report in European Patent Application No. 17809641.8, dated May 10, 2019, 10 pages.

* cited by examiner

METHOD, DEVICE, AND TERMINAL DEVICE FOR EXTRACTING DATA

CROSS-REFERENCE TO RELATED APPLICATIONS

This application is a continuation of PCT Application No. PCT/CN2017/086068, filed on May 26, 2017, which claims priority to Chinese Patent Application No. 201610399225.8, filed on Jun. 7, 2016, and each application is hereby incorporated by reference in its entirety.

TECHNICAL FIELD

The present invention relates to the field of communications technologies, and in particular, to a method, a device, and a terminal device for extracting data.

BACKGROUND

As terminal devices such as mobile phones and tablet computers are quickly developed and widely used, more and more users prefer to use terminal devices for work, life, and learning. Therefore, methods used by the terminal devices to obtain data are increasing too, for example, obtain a verification code used for registration or password retrieval by a mobile phone, and obtain a predetermined part of a certain article on a tablet computer.

A specific process of obtaining data is described below by using an example in which a verification code used for registration or password retrieval is obtained by using a touchscreen phone. On the touchscreen phone side, when a user performs an operation such as registration or password retrieval, a server sends, by using an SMS message, the verification code to a mobile phone specified by the account to confirm the identity of an operator, and the user needs to perform registration or retrieve the password by using the verification code in the SMS message. Currently, there are two operation methods to obtain the authentication code in the SMS message. Method 1: The user needs to exit an operation interface for registration or password retrieval, enables an SMS message function, and manually selects the verification code on a touchscreen and copy the verification code to obtain the verification code. Method 2: The user does not use the method of exiting the operation interface for registration or password retrieval, but obtains the verification code by checking a notification message on the mobile phone and learn it in mind.

Generally, to ensure the security of the verification code, the verification code has a certain length and complexity, for example, the verification code includes a combination of uppercase characters, lowercase characters, and numbers, to prevent the verification code to be stolen by unauthorized users and then harming the interests of the users. Although the authentication code with a certain length and complexity can ensure the security of the verification code, in Method 1, the user has to switch between different applications, such operation process is complex, and manually selecting the verification code easily causes an error; in Method 2, it is difficult for the user to learn complex verification codes, and an error is easily to be caused.

SUMMARY

Implementations of the present invention provide a method and a device for extracting data, and a terminal device, and mainly aim to resolve disadvantages in existing technology that an operation process is complex and an error rate is high in a process of extracting data, so as to quickly and accurately extract pending data.

To achieve the previously described objectives, the present invention provides the following technical solutions:

According to one aspect, the present invention provides a method for extracting data, including: receiving a pressing operation instruction on a touchscreen, and determining a pressing operation position on the touchscreen based on the pressing operation instruction; determining, based on the pressing operation position, a data area from which data needs to be extracted; determining a corresponding data extraction rule based on the data in the data area; and parsing specific data in the data area based on the data extraction rule, to extract the pending data, where the specific data is some or all data in the data area.

According to another aspect, the present invention provides a device for extracting data, including: a receiving unit, configured to receive a pressing operation instruction on a touchscreen; a first determining unit, configured to determine a pressing operation position on the touchscreen based on the pressing operation instruction received by the receiving unit; a second determining unit, configured to determine, based on the pressing operation position determined by the first determining unit, a data area from which data needs to be extracted; a third determining unit, configured to determine a corresponding data extraction rule based on the data in the data area determined by the second determining unit; and an extraction unit, configured to parse specific data in the data area based on the data extraction rule determined by the third determining unit, to extract the pending data, where the specific data is some or all data in the data area.

According to a third aspect, the present invention provides a terminal device, and the terminal device includes the previously described device for extracting data.

By using the previously described technical solutions, the technical solutions provided in the implementations of the present invention have at least the following advantages:

According to the method and the device for extracting data, and the terminal device that are provided in the present invention, the terminal device receives a pressing operation instruction on a touchscreen, determines a pressing operation position on the touchscreen based on the pressing operation instruction, determines, based on the pressing operation position, a data area from which data needs to be extracted; based on the data in the data area, determines a corresponding data extraction rule, and parses specific data in the data area based on the data extraction rule, to extract the pending data, where the specific data is some or all data in the data area. Compared with existing technology, in the present invention, the data extraction rule corresponding to the data area can be used in the data area that is determined by a user based on the pressing operation position on the touchscreen, so that the pending data can be quickly, accurately, and automatically extracted. The operation process described in this application is simple and easy, and also decreases error rate.

The previous descriptions are merely an overview of the technical solutions of the present invention. To better understand the technical means of the present invention, the previous descriptions can be implemented based on the content of the specification, and to make the previous and other objectives, features, and advantages of the present invention more obvious and comprehensible, specific implementations of the present invention are provided below as examples.

BRIEF DESCRIPTION OF DRAWINGS

It becomes clear for a person skilled in the art to learn various other advantages and benefits by reading detailed description of the following preferred implementations. The accompanying drawings are merely used for showing the preferred implementations, but not considered as a limitation on the present invention. In all the accompanying drawings, the same reference symbol is used to indicate the same part. In the accompanying drawings.

DESCRIPTION OF IMPLEMENTATIONS

Example implementations of the present application are described in more detail below with reference to the accompanying drawings. Although the example implementations of the present application are displayed in the accompanying drawings, it should be understood that the present application can be implemented in various forms, and shall not be limited by the implementations described here. Instead, these implementations are provided to provide a more thorough understanding of the present application and to convey the scope of the present application to a person skilled in the art.

Figure 1:
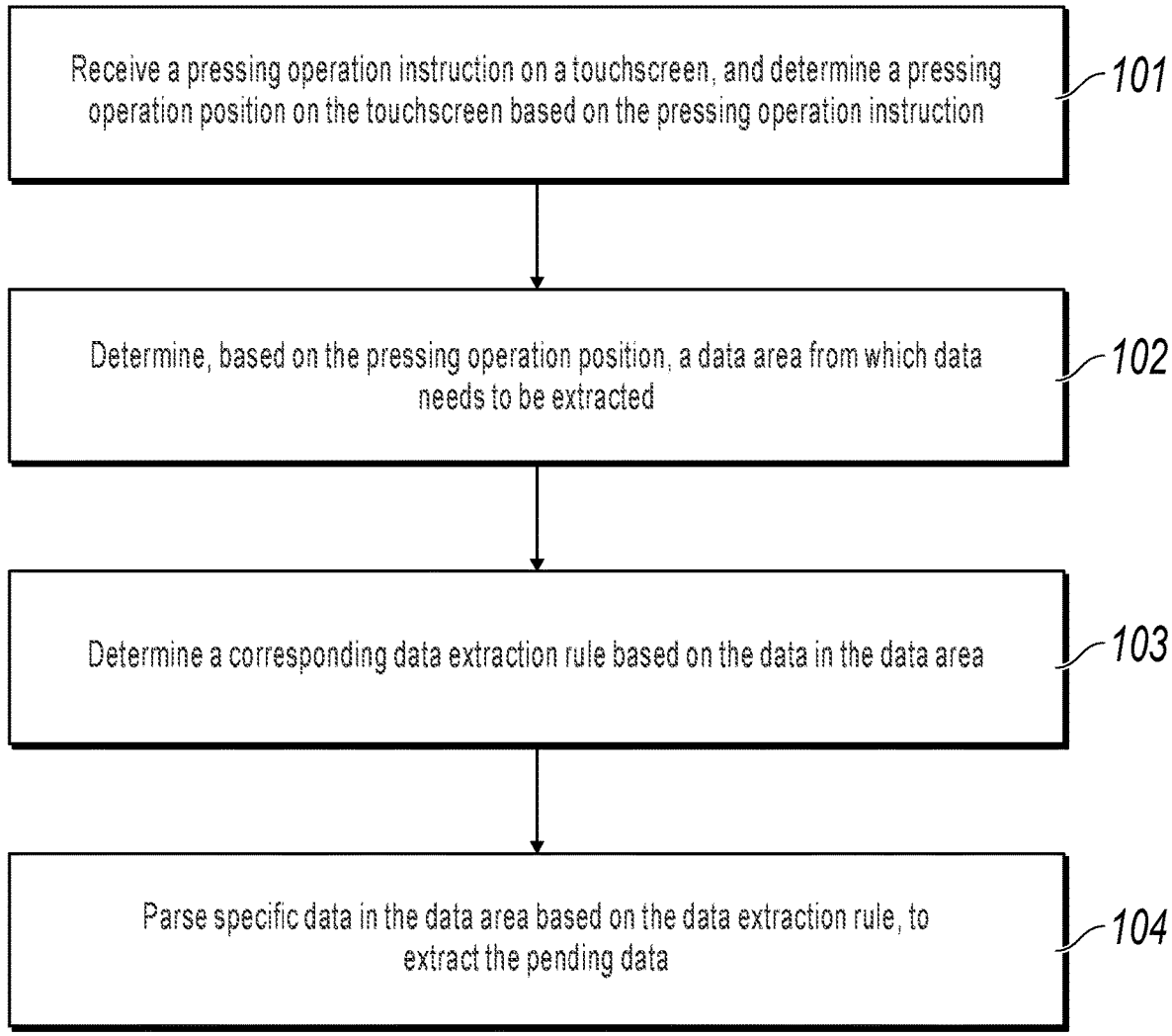
FIG. 1 is a flowchart illustrating a method for extracting data, according to an implementation of the present invention.

An implementation of the present invention provides a method for extracting data. The method is used on a terminal device side. As shown in FIG. 1, the method includes the following steps.

101: Receive a pressing operation instruction on a touchscreen, and determine a pressing operation position on the touchscreen based on the pressing operation instruction.

When a user needs to extract pending data from a terminal device, the user performs a pressing operation on a touchscreen of the terminal device, and the pressing operation is transmitted to the terminal device by using a capacitive touch sensor or a pressure touch sensor on the touchscreen of the terminal device, and the terminal device parses the pressing operation as a pressing operation instruction for the terminal device, and determines a pressing operation position on the touchscreen based on the pressing operation instruction.

The user usually performs the pressing operation on the touchscreen by using fingers. However, different users have different habits. Some users tend to press the touchscreen by using middle fingers, and some users tend to press the touchscreen by using index fingers. Regardless of the finger used to press the touchscreen, a pressing point is generated on the touchscreen. The terminal device receives the pressing operation instruction for the touchscreen based on the pressing point, and determines the pressing operation position on the touchscreen based on the pressing point. The finger used by the user to trigger the pressing operation instruction and a specific pressing position on the touchscreen of the terminal device are not limited in the present implementation of the present invention.

It is worthwhile to note that, to distinguish whether the user taps the touchscreen, or extracts data based on the pressing operation position on the touchscreen, in the present implementation of the present invention, a pressing operation used by the user to trigger the touchscreen needs to be predetermined, so that the terminal device determines the pressing operation of the user as an instruction to trigger data extraction. A smartphone is used as an example for description. If the smartphone uses an ANDROID system, after the user holds or drags a touchscreen, it is determined that the user's pressing operation on the touchscreen is a predetermined data extraction operation. If the smartphone uses an iOS system, and the system supports force touch, after the user slightly presses or heavily presses a touchscreen, it is determined that the pressing operation on the touchscreen is a predetermined data extraction operation. The previous description is merely an example. A pressing operation method of triggering to extract data on the terminal device is not limited in the present implementation of the present invention.

In the present implementation of the present invention, the terminal device needs to include a touchscreen. The terminal device can include but is not limited to a touchscreen smartphone, a tablet computer, a touchscreen personal computer, a touchscreen multimedia teaching apparatus, etc. A specific type of the terminal device is not limited in the present implementation of the present invention.

102: Determine, based on the pressing operation position, a data area from which data needs to be extracted.

The terminal device determines an actual coverage area of the pressing operation position by using a pressing point of the user on the touchscreen as a center, and the actual coverage area is the data area from which data is to be extracted.

Because users use different fingers to press the touchscreen, data areas determined based on pressing operation positions on the touchscreen have different sizes. In addition, even assume all users use index fingers to press the touchscreen, the determined data areas are still different because of the different index fingers of the users. A size of the data area from which data needs to be extracted is determined based on the pressing operation position on the touchscreen is not limited in the present implementation of the present invention.

In actual applications, because fingers of users of the terminal device have different sizes, an actual coverage area of the finger may fail to cover the pending data. Therefore, a predetermined tolerance region is set. To determine the data area, the terminal device combines the actual coverage area and the predetermined tolerance region, so that the data area is larger than the actual coverage area determined based on the pressing operation position, so as to improve the accuracy of extracting the pending data.

103: Determine a corresponding data extraction rule based on the data in the data area.

The corresponding data extraction rule is determined based on the data in the data area determined in step 101 from which data needs to be extracted. In the present implementation of the present invention, the data in the data area includes data such as numbers, upper cases and lower cases in English, graphs, Chinese characters, websites feature characters, and formulas. Because the data in the data area is unknown, the data extraction rule needs to be determined based on different data types of the data in the data area and attribute information of different data.

In the present implementation of the present invention, different users have different requirements for extracting the pending data. Therefore, a rule that is specified for different attribute information of the data and a data extraction priority rule that is specified for different data types of the data are generated. The purpose of the present step is to determine an appropriate data extraction rule based on a data type and attribute information of data selected from the data area.

In actual applications, considering convenience and practicability of using the terminal device, the user usually does not use a terminal device that includes a touchscreen to extract relatively long data, for example, extract all text data included in the entire article. On a touchscreen terminal device side, application scenarios of extracting the pending data usually include extracting a verification code in a smartphone SMS message to verify the user identity, extracting a website from web page content to jump to the web page, extracting an order number in a smartphone SMS message to check the order, extracting a formula on a web page to paste and use the formula, extracting a verification code in an SMS message function on a smartphone notification bar, etc. However, it should be clear that the previous application scenarios for extracting the pending data are merely examples, and are not intended to limit a specific application scenario of the present implementation of the present invention.

104. Parse specific data in the data area based on the data extraction rule, to extract the pending data.

The specific data is some or all data in the data area. When parsing the data in the data area, relevant data that the user wants to extract can be extracted by using only some data in the data area, or the data that the user wants to extract can be extracted by using all the data in the data area. In different data areas, different amounts of specific data are parsed to determine the data extraction rule. This is not limited in the present implementation of the present invention.

When the terminal device extracts the pending data based on the data extraction rule, to ensure the accuracy of the extracted data, after extracting the pending data, the terminal device outputs and displays the extracted pending data, so that the user can determine the accuracy of the pending data.

According to the method for extracting data provided in the present invention, the terminal device receives a pressing operation instruction on a touchscreen, determines a pressing operation position on the touchscreen based on the pressing operation instruction; determines, based on the pressing operation position, a data area from which data needs to be extracted; determines a corresponding data extraction rule based on the data in the data area, and parses specific data in the data area based on the data extraction rule, to extract the pending data, where the specific data is some or all data in the data area. Compared with existing technology, in the present invention, the data extraction rule corresponding to the data area can be used in the data area that is determined by a user based on the pressing operation position on the touchscreen, so that the pending data can be quickly, accurately, and automatically extracted, an operation process is simple and easy, and an error rate is low.

Further, for better understanding of the method shown in FIG. 1, as details and extension to the previous implementations, the steps in FIG. 1 are described in detail in the present implementation of the present invention.

In step 103, the corresponding data extraction rule is determined based on the data in the data area, and data included in the data area is uncertain. Therefore, when determining the data extraction rule, the data extraction rule for extracting the pending data can be determined by using the following two methods:

Method 1: Determine a type of data in the data area, and determine a corresponding data extraction rule based on the data type.

The data extraction rule in the present implementation of the present invention has different priorities for different data types. Therefore, the type of data in the area can be determined by determining the type of data, so as to determine, based on the priority of the data extraction rule, the data extraction rule used to extract the data.

In Method 1, the type of data in the data area needs to be determined before the data extraction rule is determined. A type of each piece of data in the data area is determined based on a character input status of the data during compilation. A specific implementation process includes: sequentially parsing all the data in the data area, determining whether the character input status of each piece of data is double-byte or single-byte, and determining the type of each piece of data based on the character input status. The double-byte means that one character occupies two standard character positions, and the double-byte usually includes Chinese characters, stipulated double-byte English characters, graphic symbols and special characters in the GB2312-80, etc. The single-byte means that one character occupies one standard character position, and the single-byte usually includes English letters, numbers, and symbols of the Western languages.

In actual applications, the data in the data area consists of a plurality of continuous characters. In addition, based on the number of standard character positions occupied by the double-byte or the single-byte, during determining of the character input status of each piece of data, the type of the data can be determined by determining a standard character position occupied by each character in the data area.

Method 2: Obtain attribute information of the data in the data area, and determine a data extraction rule based on the attribute information.

In Method 2, the attribute information of the data in the data area can be obtained by using the following method. For example, all the data in the data area is segmented into words, data obtained after word segmentation is searched for data that matches a predetermined keyword, and attribute information of the data is determined based on the predetermined keyword. The predetermined keyword is in one-to-one mapping relationship with the attribute information, and is used to identify the attribute information. In the present implementation of the present invention, when the data in the data area is segmented into words, references can be made to any word segmentation method in existing technology, and the word segmentation method is not described here again in the present implementation of the present invention.

In actual applications, a current application scenario of the data can be determined based on the attribute information (the predetermined keyword) of the data in the data area. For example, when the predetermined keyword of the data is an SMS message verification code or a mobile phone confirmation code, it can be determined that a current application scenario of data extracted by the terminal device is an SMS message application of a smartphone. When the predetermined keyword of the data is content such as "http://", ".com", or ".cn", it can be determined that a current application scenario of data extracted by the terminal device is webpage browsing. The previous descriptions are merely examples, and do not limit an application scenario for extracting the data in the data area.

For example, Table 1 shows a mapping relationship between attribute information and a data extraction rule, according to an implementation of the present invention. When data obtained after word segmentation in the data area matches any predetermined keyword in Table 1, a data extraction rule corresponding to the predetermined keyword is determined. A predetermined keyword (order number *) in Table 1 is used as an example for description. * represents any one or more pieces of data after the order number. When data obtained after word segmentation includes data such as "an order number is", "order number", and "order number:", all of them can match the predetermined keyword. Therefore, it is determined that a data extraction rule is to extract continuous digit data after the order number * and before the punctuation mark.

confirming the pending data is displayed until the terminal device receives a predetermined confirmation instruction, to obtain the pending data after re-extraction.

When the data extraction rule is the data extraction rule determined based on Method 2, extracting the pending data from the data area based on the determined data extraction rule includes: directly extracting the pending from the data area based on the determined data extraction rule. It is worthwhile to note that, in Method 2, the determined data extraction rule is in one-to-one mapping relationship with the attribute information. That is, when the attribute information of the data in the data area is confirmed, the data is extracted based on the data extraction rule corresponding to the attribute information (the predetermined keyword), and a priority of the data extraction rule is not set. Two examples are provided below to describe data extraction rules determined when data in different application scenarios is extracted. Example 1: If it is determined that the data in the data area is verification code information in an SMS message, the terminal device performs word segmentation and semantic parsing on all the data in the data area. When obtaining a predetermined keyword verification code, the terminal device automatically obtains substantive data of the

TABLE 1

| Predetermined keyword | Data extraction rule | Notes |
|---|---|---|
| http://* | Extract the entire website | |
| *.com/.cn | | |
| Shipping number *, order number * | Extract continuous digit data before the order number * and before the punctuation mark | |
| Verification code */verification information */mobile phone confirmation code */confirmation code * | Extract continuous character string data after the verification code */verification information */mobile phone confirmation code */confirmation code * and before the punctuation mark | |
| Formula */area */size * | Extract a formula after the formula */area */size * and before the punctuation mark | |
| Phone number */telephone number * | Extract continuous character string information after the phone number/telephone number and before the punctuation mark | |
| *@*.cn/*@*.com | Extract the mailbox address that includes the corresponding predetermined keyword | |
| ... | ... | |

Further, the implementation of the present invention can automatically, quickly, and accurately extract data on the terminal device, and after the corresponding data extraction rule is determined based on the data in the data area, the data is extracted based on the data extraction rule. When the data extraction rule is the data extraction rule determined based on Method 1, the pending data is extracted based on a data extraction rule with the highest priority, and after the pending data is extracted, the prompt information used for displaying the determined pending data is output, so that the user determines whether the pending data is data that the user wants to extract. If the user determines that the pending data is correct, a confirm button in the prompt information is triggered, and the terminal device receives a predetermined confirmation instruction, automatically copies the pending data to a system clipboard, and outputs prompt information indicating that the pending data is successfully obtained, so that the user can use the pending data. If the user determines that the pending data is incorrect, the user triggers a reselection button in the prompt information, and the terminal device receives a predetermined reselection instruction, and continues to extract the data in the data area by using a data extraction rule with the second highest priority. After the data is extracted, prompt information for verification code, for example, :123abc. Example 2: If it is determined that the data area includes a certain web site link or a part of a certain web site link, the terminal device analyzes the attribute information of the data and extracts the website link because the data area determined by the user based on the pressing operation position on the touchscreen is smaller than the website link or the part of the website link. The previous two examples are merely examples. In the present implementation of the present invention, a specific application scenario corresponding to the data area is not limited.

It is worthwhile to note that, when the terminal device determines the corresponding data extraction rule based on Method 1 or Method 2, if the data extraction rule cannot be determined based on Method 1, the data extraction rule can be determined based on Method 2, and if the data extraction rule cannot be determined based on Method 2, the data extraction rule can be determined based on Method 1. In the present implementation of the present invention, a method used for determining the data extraction rule is not limited, and the data extraction rule needs to be determined based on the data in the data area.

Figure 2:
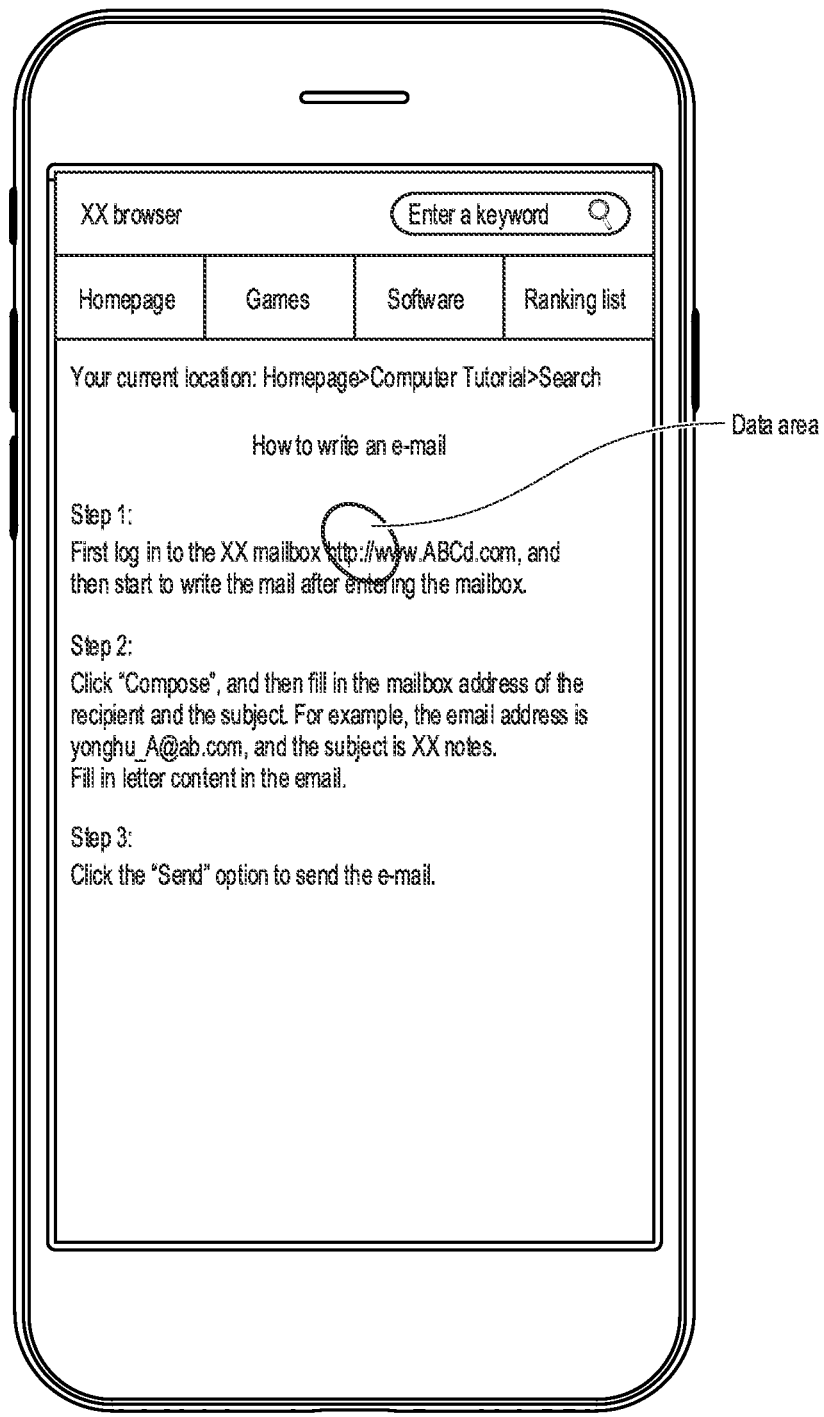
FIG. 2 is a schematic diagram illustrating how to determine a data area on a browser web page of a tablet computer, according to an implementation of the present invention.
Figure 3:
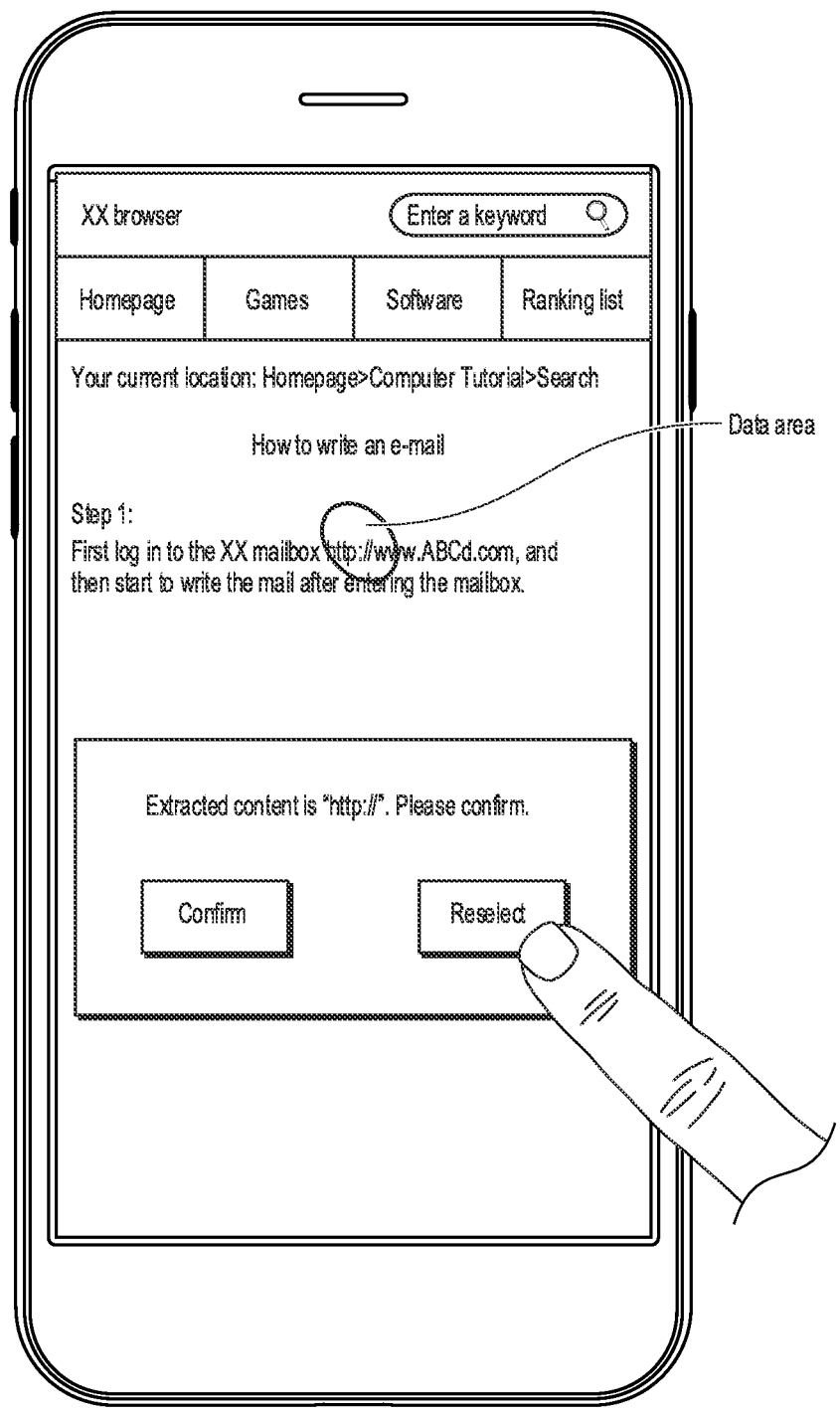
FIG. 3 is a schematic diagram illustrating how to output prompt information for determining/reselecting pending data, according to an implementation of the present invention.

For example, as shown in FIG. 2, the user uses a browser in a tablet computer to browse a web page, to extract data http://ABCd.com on the web page, and the terminal device determines the data area shown in FIG. 2 based on the pressing operation instruction of the user. The data in the data area includes "http://", the terminal device parses the data http://, determines a character input status of each piece of data has only a single-byte. Thus, based on the type of data, the data extraction rule is to extract only a single-byte character. After extracting the pending data "http://", as shown in FIG. 3, the terminal device outputs prompt information used for displaying "determine/reselect pending data" by using a dialog box. After tapping a reselect button, the user re-obtains the pending data. All the data in the data area is segmented into words, data obtained after word segmentation is matched with the predetermined keyword. The predetermined keyword is in one-to-one mapping relationship with the attribute information of the data. The determined attribute information of the data is a web site. It is determined based on the attribute information that the data extraction rule is to extract the entire website, and after pending data "http://www.ABCd.com" is extracted, prompt information used for determining or reselecting the pending data is displayed, and after the user triggers a confirm button, http://www.ABCd.com is automatically copied to a system clipboard for the user to use.

Optionally, when extracting the pending data by parsing the data in the data area based on the data extraction rule, first remove redundant data between the data in the data area, and then extracts, based on the data extraction rule, pending data obtained after the redundant data is removed. The redundant data can include but is not limited to space, punctuation marks, etc.

Further, before determining the corresponding data extraction rule based on the data in the data area, the data extraction rule is generated, and the data extraction rule is configured. The data extraction rule can be configured by using the following method. For example, a priority of the data extraction rule is configured based on different data types; or the data extraction rule is configured based on the attribute information of the data. Generally, when the data extraction rule is configured based on the attribute information, the attribute information and the data extraction rule are in one-to-one mapping relationship.

For example, when the priority of the data extraction rule is configured based on different data types, a data extraction rule in which extracted characters include a single-byte character is set to the highest priority; or if data types in the data area include both a double-byte character and a single-byte character, the amount of data corresponding to the single-byte character and the amount of data corresponding to the double-byte character are separately counted, and characters with the larger amount between the single-byte characters and double-byte characters are extracted; or a data extraction rule in which extracted characters include only numbers is set. The previous description is merely an example, and a specific method for configuring the data extraction rule is not limited in the present implementation of the present invention.

Further, because users' fingers are of different sizes, determined data areas may have different sizes or may be incomplete. Therefore, the terminal device sets a predetermined tolerance region to resolve the previous problem. When setting the predetermined tolerance region, the terminal device can set the predetermined tolerance region as a fixed area, or set the predetermined tolerance region to a predetermined percentage of the actual coverage area of the pressing operation position on the touchscreen. When determining, based on the pressing operation position on the touchscreen, the data area from which data needs to be extracted, the terminal device determines the actual coverage area of the pressing operation position on the touchscreen, obtains the predetermined tolerance region, and combines the actual coverage area and the predetermined tolerance region, to determine the data area. A specific method for setting the predetermined tolerance region is not limited in the present implementation of the present invention.

Figure 4:
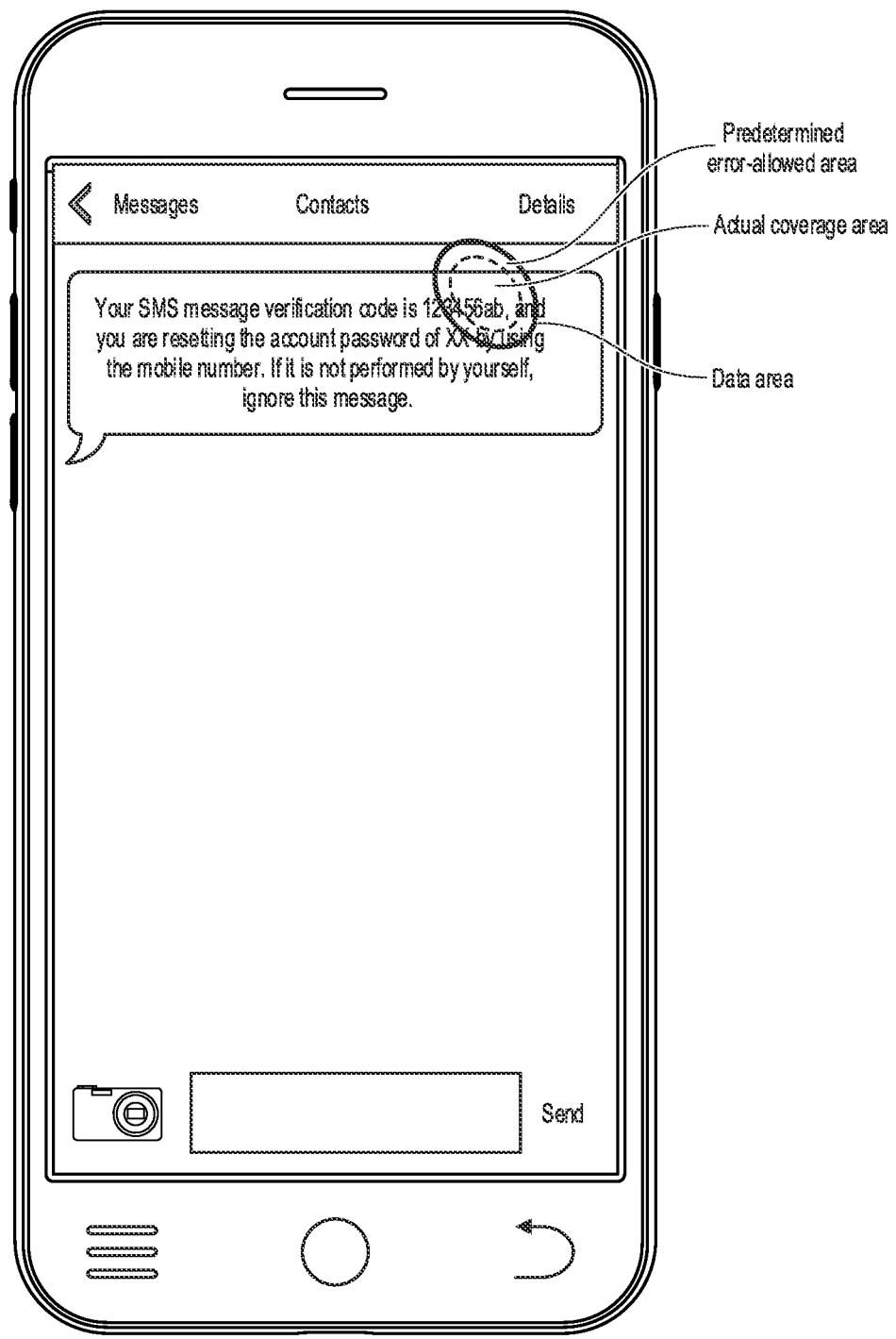
FIG. 4 is a schematic diagram illustrating how to determine a data area of a smartphone, according to an implementation of the present invention.

For example, to describe in detail a process of determining the data area, supplementary descriptions are provided below as examples. For example, FIG. 4 is a schematic diagram illustrating how a mobile phone determines a data area, according to an implementation of the present invention. As shown in FIG. 4, it is assumed that the terminal device is a smartphone. A user of the terminal device wants to obtain verification code information in an SMS message. The user obtains the verification code through touching and holding. An actual coverage area of a pressing operation position on a touchscreen is shown by dotted lines in the figure. After the actual coverage area and a predetermined tolerance region are combined, a solid line area in the figure, that is, a data area, is determined. It is worthwhile to note that, FIG. 4 is merely an example, and a position from which the user extracts data is not limited in the present implementation of the present invention.

Further, to help the user use the successfully extracted data, after extracting the pending data, the terminal device outputs prompt information indicating that the pending data is successfully obtained. When the prompt information indicating that the pending data is successfully obtained is output, the prompt information can be displayed by popping out a dialog box; or after successfully obtaining the pending data, the user of the terminal device is notified through audio broadcasting. The form of the prompt information indicating that the pending data is successfully obtained is not limited in the present implementation of the present invention.

A process of extracting pending data from the terminal device is described in detail above. It is worthwhile to note that, in the method provided in the present implementation of the present invention, data such as numbers, letters, and special symbols is extracted in a Chinese language scenario, and the data can be quickly and accurately extracted. However, if a Chinese character is to be extracted in the Chinese language scenario, the data cannot be accurately and automatically extracted by using the method provided in the present invention. The Chinese can be extracted in the Chinese language scenario by using a method of manually selecting pending data in the existing technology. Similarly, data such as Chinese characters and special symbols in an application scenario of English and other languages can also quickly and accurately extracted, but data of the same language may not be accurately and automatically extracted in the application scenario of English and other languages.

Further, as implementation of the method shown in FIG. 1, another device for extracting data is provided according to an implementation of the present invention. The device implementation is corresponding to the previous method implementations. For ease of reading, detailed content in the method implementations is not repeatedly described in the present device implementation, but it should be clear that the device in the present implementation can correspondingly implement all content in the previous method implementations.

Figure 5:
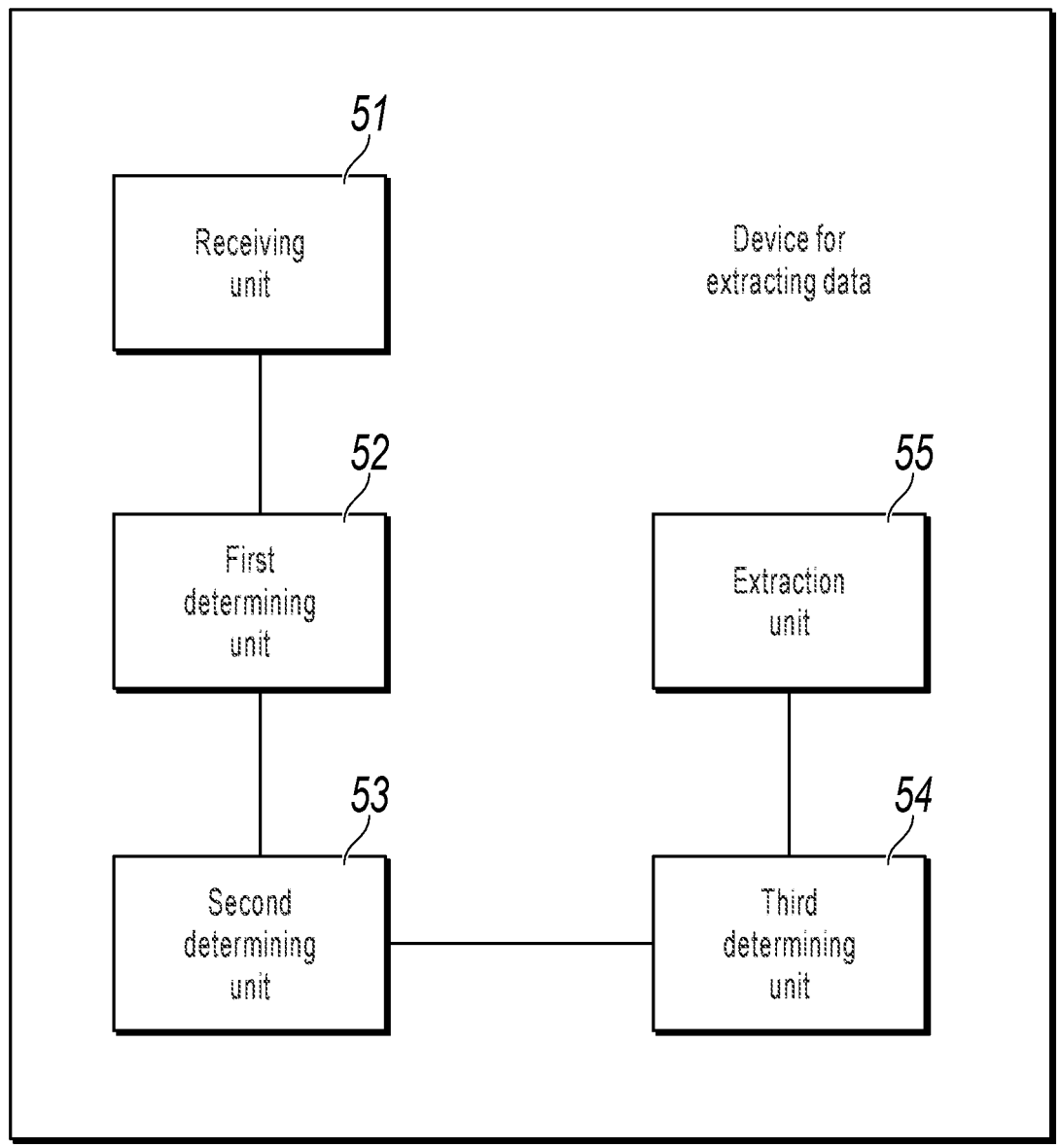
FIG. 5 is a compositional block diagram illustrating a device for extracting data, according to an implementation of the present invention.

An implementation of the present invention provides a device for extracting data. As shown in FIG. 5, the device includes: a receiving unit 51, configured to receive a pressing operation instruction on a touchscreen; a first determining unit 52, configured to determine a pressing operation position on the touchscreen based on the pressing operation instruction received by the receiving unit 51; a second determining unit 53, configured to determine, based on the pressing operation position determined by the first determining unit 52, a data area from which data needs to be extracted; a third determining unit 54, configured to determine a corresponding data extraction rule based on the data in the data area determined by the second determining unit 53; and an extraction unit 55, configured to parse specific data in the data area based on the data extraction rule determined by the third determining unit 54, to extract the pending data, where the specific data is some or all data in the data area.

Figure 6:
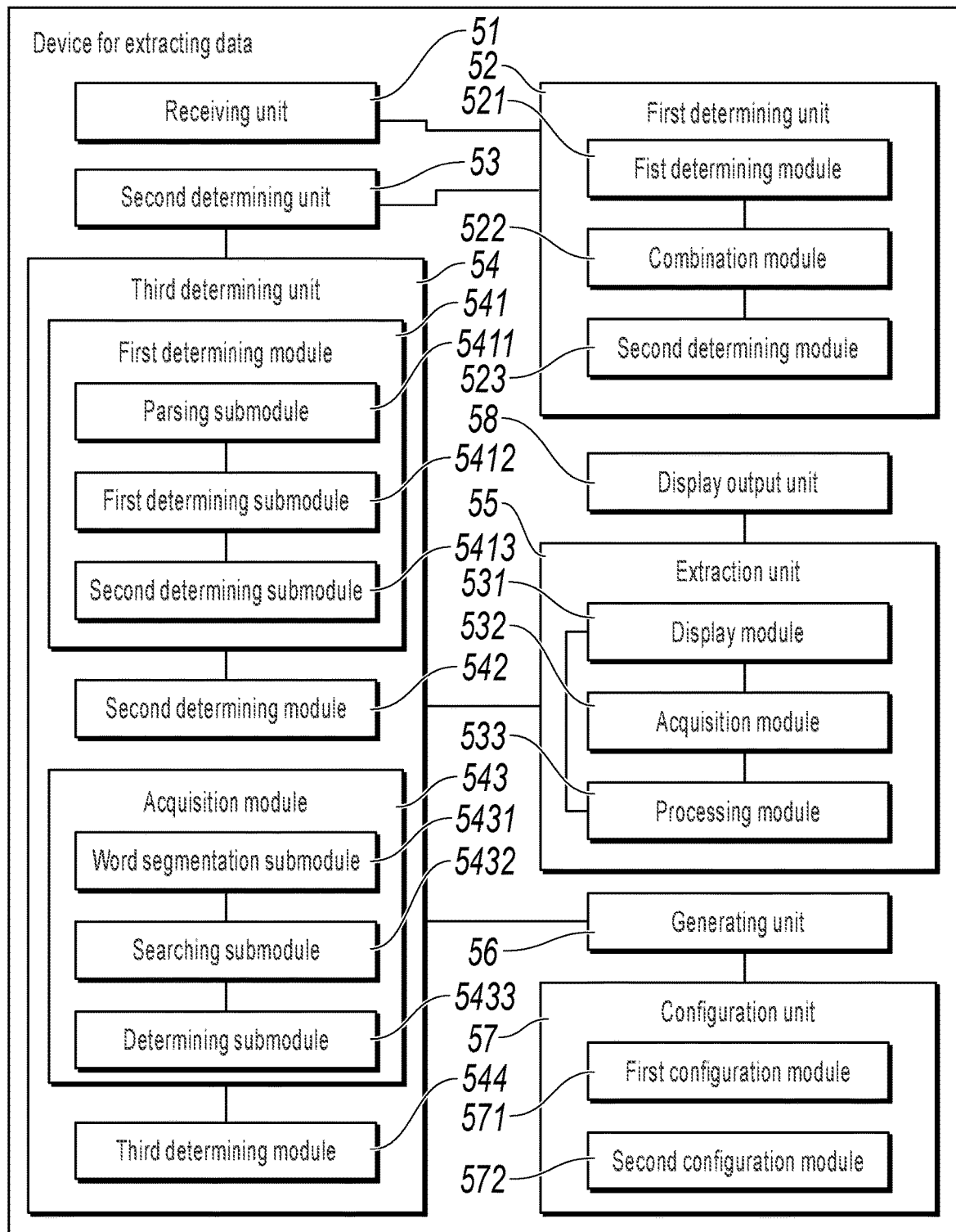
FIG. 6 is a compositional block diagram illustrating another device for extracting data, according to an implementation of the present invention.

Further, as shown in FIG. 6, the third determining unit 54 includes: a first determining module 541, configured to determine a data type of the data in the data area; and a second determining module 542, configured to determine the data extraction rule corresponding to the data type based on the data type determined by the first determining module 541, where the data extraction rule has different priorities for different data types.

Further, as shown in FIG. 6, the first determining module 541 includes: a parsing submodule 5411, configured to sequentially parse all the data in the data area; a first determining submodule 5412, configured to determine a character input status of each piece of data in a process in which the parsing submodule 5411 sequentially parses all the data in the data area, where the character input status includes double-byte and single-byte; and a second determining submodule 5413, configured to determine a type of each piece of data based on the character input status determined by the first determining submodule 5412.

Further, the extraction unit 55 parses the specific data in the data area based on a data extraction rule with the highest priority to extract the pending data.

Further, as shown in FIG. 6, the extraction unit 55 includes: a display unit 551, configured to display prompt information for confirming the pending data; an acquisition module 552, configured to obtain the pending data if a predetermined confirmation instruction is received; and a processing module 553, configured to continue to extract the specific data in the data area based on a data extraction rule priority until a predetermined confirmation instruction is received, to obtain the pending data after re-extraction if a predetermined reselection instruction is received.

Further, as shown in FIG. 6, the third determining unit 54 further includes: an acquisition module 543, configured to obtain attribute information of the data in the data area; and a third determining module 544, configured to determine the data extraction rule based on the attribute information obtained by the acquisition module 543.

Further, as shown in FIG. 6, the acquisition module 543 includes: a word segmentation submodule 5431, configured to segment all the data in the data area into words; a searching submodule 5432, configured to search data obtained after the word segmentation submodule 5431 performs word segmentation for data that matches a predetermined keyword, where the predetermined keyword is used to identify the attribute information; and a determining submodule 5433, configured to determine attribute information of the data based on the predetermined keyword identified by the searching submodule 5432.

Further, as shown in FIG. 6, the device further includes: a generating unit 56, configured to generate the data extraction rule before the third determining unit 54 determines the corresponding data extraction rule based on the data in the data area; and a configuration unit 57, configured to configure the data extraction rule generated by the generating unit 56.

Further, as shown in FIG. 6, the configuration unit 57 includes: a first configuration module 571, configured to set a priority of the data extraction rule based on different data types; and a second configuration module 572, configured to configure the data extraction rule based on the attribute information of the data.

Further, as shown in FIG. 6, the first determining unit 52 includes: a first determining module 521, configured to determine an actual coverage area of the pressing operation position on the touchscreen; a combination module 522, configured to combine the actual coverage area determined by the first determining module 521 and a predetermined tolerance region; and a second determining module 523, configured to determine the data area after the combination module 522 combines the actual coverage area and the predetermined tolerance region.

Further, as shown in FIG. 6, the device further includes: a display output unit 58, configured to extract the pending data, and output prompt information indicating that the pending data is successfully obtained after the extraction unit 55 parses the data in the data area based on the data extraction rule.

Further, an implementation of the present invention further provides a terminal device, and the terminal device includes the device for extracting data shown in either FIG. 5 or FIG. 6.

According to the device for extracting data and the terminal device that are provided in the implementations of the present invention, the terminal device receives a pressing operation instruction on a touchscreen, determines a pressing operation position on the touchscreen based on the pressing operation instruction, determines, based on the pressing operation position, a data area from which data needs to be extracted, determines a corresponding data extraction rule based on the data in the data area, and parses data in the data area based on the data extraction rule, to extract the pending data, where the specific data is some or all data in the data area. Compared with existing technology, in the implementations of the present invention, the data extraction rule corresponding to the data area can be used in the data area that is determined by a user based on the pressing operation position on the touchscreen, so that the pending data can be quickly, accurately, and automatically extracted, an operation process is simple and easy, and an error rate is low.

The data generation device includes a processor and a memory, and the first determining unit, the second determining unit, the third determining unit, and the extraction unit are stored in the memory as program units, and the processor executes the previously described program units stored in the memory to implement corresponding functions.

The processor includes a kernel, and the kernel invokes a corresponding program unit from the memory. One or more kernels can be set, to resolve disadvantages in existing technology that an operation process is complex and an error rate is high in a process of extracting data, so as to quickly and accurately extract pending data.

The memory can include a non-permanent memory in a computer readable medium, a random access memory (RAM) and/or a non-volatile memory, such as a read-only memory (ROM) or a flash memory (flash RAM), and the memory includes at least one storage chip.

The present application further provides a computer program product. When executed on a data processing device, the computer program product is suitable for executing program code including the following method steps: receiving a pressing operation instruction on a touchscreen, and determining a pressing operation position on the touchscreen based on the pressing operation instruction; determining, based on the pressing operation position, a data area from which data needs to be extracted; determining a corresponding data extraction rule based on the data in the data area; and parsing specific data in the data area based on the data extraction rule, to extract the pending data, where the specific data is some or all data in the data area.

A person skilled in the art should understand that the implementations of the present application can be provided as a method, a system, or a computer program product. Therefore, the present application can use hardware only implementations, software only implementations, or implementations with a combination of software and hardware. In addition, the present application can use a form of a computer program product that is implemented on one or more computer-usable storage media (including but not limited to a magnetic disk storage, a CD-ROM, and an optical memory) that include computer-usable program code.

The present application is described with reference to the flowcharts and/or block diagrams of the graph display method, the device, and the computer program product according to the implementations of the present application. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions can be stored in a computer readable memory that can instruct the computer, or the another programmable data processing device to work by using a specific method, so that the instructions stored in the computer readable memory generate an artifact that includes an instruction device. The instruction device implements a specific function in one or more processes in the flowcharts and/or in one or more blocks in the block diagrams.

These computer program instructions can be loaded onto the computer or the another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPU), an input/output interface, a network interface, and a memory.

The memory can include a non-permanent memory in a computer readable medium, a random access memory (RAM) and/or a non-volatile memory, such as a read-only memory (ROM) or a flash memory (flash RAM). The memory is an example of the computer readable medium.

The computer readable medium includes persistent, non-persistent, movable, and unmovable media that can implement information storage by using any method or technology. Information can be a computer readable instruction, a data structure, a program module, or other data. Examples of a computer storage medium include but are not limited to: a phase-change random access memory (PRAM), a static random access memory (SRAM), a dynamic random access memory (DRAM) or another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a magnetic cassette, a magnetic tape, a magnetic tape/magnetic disk memory or another magnetic storage device, or any other non-transmission medium that can be used to store information that can be accessed by a computing device. Based on the definition in the present specification, the computer readable medium does not include transitory computer-readable media (transitory media), for example, a modulated data signal and carrier.

The above-mentioned descriptions are merely the implementations of the present application, but are not intended to limit the present application. For a person skilled in the art, the present application can have various modifications and changes. Any modifications, equivalent substitutions, improvements, etc. made in the spirit and principle of the present application shall fall in the scope of the claims in the present application.

Figure 7:
FIG. 7 is a flowchart illustrating an example of a computer-implemented method for extracting data, according to an implementation of the present disclosure.

FIG. 7 is a flowchart illustrating an example of a computer-implemented method 700 for extracting data, according to an implementation of the present disclosure. For clarity of presentation, the description that follows generally describes method 700 in the context of the other figures in this description. However, it will be understood that method 700 can be performed, for example, by any system, environment, software, and hardware, or a combination of systems, environments, software, and hardware, as appropriate. In some implementations, various steps of method 700 can be run in parallel, in combination, in loops, or in any order.

At 705, a pressing operation position on a touchscreen of a terminal device is determined based on a pressing operation instruction received from a user.

At 710, a data area from which data is to be extracted is determined based on the pressing operation position. In some cases, determining the data area from which data needs to be extracted includes determining a coverage area of the pressing operation position based on the pressing point of the user, wherein the data area from which the data is to be extracted includes the coverage area and a predetermined tolerance region.

At 715, a data extraction rule for use in extracting the data from the data area is determined. In some cases, the data extraction rule is based on a data type of the data to be extracted or based on attribute information of the data to be extracted.

At 720, data is extracted from the data area based on the determined data extraction rule.

At 725, the extracted data is displayed on the touchscreen.

In some cases, the method 700 includes, prior to determining the pressing operation position, receiving, at a sensor of the touch screen, a pressing operation from a user; and identifying a pressing operation instruction corresponding to the received pressing operation. In some cases, the pressing operation is generated based on a pressing point on the touch screen pressed by a user's finger, and wherein the pressing operation position is determined based on the pressing point. In some implementations, data in the data area is sequentially parsed to determine a character input status of each piece of the data; a data type of each piece of the data is determined based on the determined character input status; and the data extraction rule is determined based on the determined data type.

In some implementations, the method 700 includes segmenting the data into a one or more words; matching each word with a predetermined keyword; determining attribution information of each word based on the matched predetermined keyword; and determining the data extraction rule based on the attribution information of the data.

In some cases, the data extraction rule is a first data extraction rule based on a data type of the data to be extracted, and the method 700 includes extracting the data based on the first data extraction rule; determining the user is not satisfied with the data extracted based on the first data extraction rule; and in response to determining the user is not satisfied, extracting the data based on a second data extraction rule based on attribute information of the data to be extracted.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

The invention claimed is:

1. A computer-implemented method, comprising:
   determining a particular set of characters that are located in a region of a user interface that is associated with a user selection;
   selecting, from among a single-byte data extraction rule and a double-byte data extraction rule, a data extraction rule for use as a highest priority data extraction rule in extracting a subset of the particular set of characters that are located in the region of the user interface that is associated with the user selection, comprising:
      determining that the particular set of characters comprises both one or more double-byte characters and one or more single-byte characters;
      counting a first amount of the one or more double-byte characters and counting a second amount of the one or more single-byte characters;
      determining whether the first amount of the double-byte characters is larger than the second amount of the single-byte characters;
      in response to determining that the first amount of the double-byte characters is larger than the second amount of the single-byte characters, selecting the double-byte data extraction rule as the highest priority data extraction rule; or
      in response to determining that the first amount of the double-byte characters is not larger than the second amount of the single-byte characters, selecting the single-byte data extraction rule as the highest priority data extraction rule;
   extracting, as an extracted subset, a subset of one or more characters from the particular set of characters by on applying the highest priority data extraction rule to the particular set of characters; and
   providing the extracted subset of the one or more characters to display on the user interface.

2. The computer-implemented method of claim 1, wherein the user selection comprises a touch operation on a touchscreen of a mobile device.

3. The computer-implemented method of claim 1, wherein the extracted subset comprises a verification code sent by short message service (SMS).

4. The computer-implemented method of claim 1, wherein the extracted subset includes one or more characters outside of a coverage area of a touch on a touchscreen.

5. The computer-implemented method of claim 1, wherein the single-byte data extraction rule is associated with an English-language mode, and wherein the double-byte data extraction rule is associated with a Chinese-language mode.

6. A non-transitory, computer-readable storage medium coupled to one or more computers and configured with instructions executable by the one or more computers to perform operations comprising:
   determining a particular set of characters that are located in a region of a user interface that is associated with a user selection;
   selecting, from among a single-byte data extraction rule and a double-byte data extraction rule, a data extraction rule for use as a highest priority data extraction rule in extracting a subset of the particular set of characters that are located in the region of the user interface that is associated with the user selection, comprising:
      determining that the particular set of characters comprises both one or more double-byte characters and one or more single-byte characters;
      counting a first amount of the one or more double-byte characters and counting a second amount of the one or more single-byte characters;
      determining whether the first amount of the double-byte characters is larger than the second amount of the single-byte characters;
      in response to determining that the first amount of the double-byte characters is larger than the second amount of the single-byte characters, selecting the double-byte data extraction rule as the highest priority data extraction rule; or
      in response to determining that the first amount of the double-byte characters is not larger than the second amount of the single-byte characters, selecting the single-byte data extraction rule as the highest priority data extraction rule;
   extracting, as an extracted subset, a subset of one or more characters from the particular set of characters by on applying the highest priority data extraction rule to the particular set of characters; and
   providing the extracted subset of the one or more characters to display on the user interface.

7. The non-transitory, computer-readable storage medium of claim 6, wherein the user selection comprises a touch operation on a touchscreen of a mobile device.

8. The non-transitory, computer-readable storage medium of claim 6, wherein the extracted subset comprises a verification code sent by short message service (SMS).

9. The non-transitory, computer-readable storage medium of claim 6, wherein the extracted subset includes one or more characters outside of a coverage area of a touch on a touchscreen.

10. The non-transitory, computer-readable storage medium of claim 6, wherein the single-byte data extraction rule is associated with an English-language mode, and wherein the double-byte data extraction rule is associated with a Chinese-language mode.

11. A computer-implemented system comprising:
one or more computers; and
one or more computer-readable memories coupled to the one or more computers and configured with instructions executable by the one or more computers to perform operations comprising:
  determining a particular set of characters that are located in a region of a user interface that is associated with a user selection;
  selecting, from among a single-byte data extraction rule and a double-byte data extraction rule, a data extraction rule for use as a highest priority data extraction rule in extracting a subset of the particular set of characters that are located in the region of the user interface that is associated with the user selection, comprising:
    determining that the particular set of characters comprises both one or more double-byte characters and one or more single-byte characters;
    counting a first amount of the one or more double-byte characters and counting a second amount of the one or more single-byte characters;
    determining whether the first amount of the double-byte characters is larger than the second amount of the single-byte characters;
    in response to determining that the first amount of the double-byte characters is larger than the second amount of the single-byte characters, selecting the double-byte data extraction rule as the highest priority data extraction rule; or
    in response to determining that the first amount of the double-byte characters is not larger than the second amount of the single-byte characters, selecting the single-byte data extraction rule as the highest priority data extraction rule;
  extracting, as an extracted subset, a subset of one or more characters from the particular set of characters by on applying the highest priority data extraction rule to the particular set of characters; and
  providing the extracted subset of the one or more characters to display on the user interface.

12. The computer-implemented system of claim 11, wherein the user selection comprises a touch operation on a touchscreen of a mobile device.

13. The computer-implemented system of claim 11, wherein the extracted subset comprises a verification code sent by short message service (SMS).

14. The computer-implemented system of claim 11, wherein the extracted subset includes one or more characters outside of a coverage area of a touch on a touchscreen.

* * * * *